United States Patent [19]

Cedercreutz et al.

[11] Patent Number: 4,681,287
[45] Date of Patent: Jul. 21, 1987

[54] SPIRAL WIRE AND A METHOD OF MANUFACTURING SUCH A WIRE

[75] Inventors: Axel Cedercreutz, Tampere; Ari Salminen, Suorama, both of Finland

[73] Assignee: Tamfelt Oy AB, Tampere, Finland

[21] Appl. No.: 773,190

[22] Filed: Sep. 6, 1985

[30] Foreign Application Priority Data

Oct. 1, 1985 [FI] Finland ............................. 850113

[51] Int. Cl.⁴ ............................................. B21F 27/00
[52] U.S. Cl. ....................................... 245/6; 140/3 R
[58] Field of Search ................... 140/3 R, 92.4, 92.7, 140/107, 108; 245/6, 10; 178/848

[56] References Cited

U.S. PATENT DOCUMENTS 2,357,492  9/1944  Abendroth ................. 139/425 A
2,533,439 12/1950  Elder ........................ 139/425 R
3,376,002  4/1968  Andrews et al. ................. 245/6
4,345,730  8/1982  Leuvelink ........................ 245/6

Primary Examiner—Lowell A. Larson
Attorney, Agent, or Firm—Lowe Price LeBlanc Becker & Shur

[57] ABSTRACT

A spiral wire and a method of manufacturing a spiral wire comprising adjacent spirals (1) positioned in pairs with their loops (1a) intermeshing to form rows of loops in the transverse direction of the wire, and link threads (2) inserted in the rows. The wire is subjected to thermal fixation by simultaneous stretching and heating thereof. In order to fix the loops axially immovably on the link threads, the link thread is formed by a core thread (3) provided with a coating (4) deformable at a lower temperature than the core thread. During the thermal fixation, the coating softens and is pressed from under the loops into the spaces between the loops and the coating is provided with grooves (5) for fixing of the loops without deformation of the core thread.

6 Claims, 5 Drawing Figures

SPIRAL WIRE AND A METHOD OF MANUFACTURING SUCH A WIRE

TECHNICAL FIELD

This invention relates to a spiral wire and to a method of manufacturing such a spiral wire formed by adjacent spirals and, more particularly, to a spiral wire in which wire spirals are positioned in pairs with their loops intermeshing to form rows of loops in the traverse direction of the wire, a link thread is passed through each row of loops, and the wire is subjected to longitudinal stretching and thermal treatment to fix the link threads axially immovably with respect to the loops.

BACKGROUND OF THE INVENTION

Besides conventional drying and filtering wires, the word 'wire' is here intended to cover also base fabrics for press felts, different kinds of conveyor belts and other such products of a wire-like structure.

In such a spiral wire, the spirals are interconnected by means of connecting or link threads which extend through the loops of adjacent spirals. In order to ensure the cohesion of the wire thus obtained, the link threads and the loops of the sprials must be prevented from moving with respect to each other in the axial direction of the link thread.

It is previously well known to subject a drying wire woven of a synthetic thread material to a so called thermal fixation, in which the thread material is heated to a temperature near the softening temperature of the thermoplastic thread and the wire is simultaneously stretched into a desired length. In this way, the thread material can be stabilized so that the thread maintains the shape thereof and the wire maintains its length as well as possible during operating conditions.

It is mentioned in Finnish Patent Application No. 801,672, which corresponds to German Patent Application No. 2,921,491, filed on May 26, 1979, that when the link thread is of a synthetic thermoplastic material, the link thread is deformed during the thermal fixation into a wave-like shape in such a manner that bends are formed in the link thread which keep the loops of the spirals in place with respect to the link thread.

Such a fixing of the link threads and the loops is based on a deformation of the entire link thread into a plurality of bends. Consequently, the formed bends are relatively smooth, wherefore the edges of the wire easily fray, when the edge loops slip over the smooth bends of the link threads. It has also been observed that the deformations of the link threads caused by the thermal fixation when the threads are drawn into bends diminish the original resistance to hydrolysis of the threads. In addition, the edges of the wire may be damaged as a result of a weakening of the link thread at the edge of the wire, where the hydrolysis is usually more rapid due to the higher temperature at the edge of the wire as compared with the center of the wire. Such damage is one of the most important disadvantages of a spiral wire and a need therefore exists for a method that provides a wire free of such problems.

SUMMARY OF THE INVENTION

The object of the present invention is to provide a method of manufacturing a spiral wire, which method avoids the above disadvantages and enables fixing of the link thread and the loops of the spirals with respect to each other without any essential need to deform the link thread itself. This object is achieved by means of the method according to the invention, which is characterized in that the link thread is formed by a core thread provided with a coating deformable at a lower temperature than the core thread, and that the thermal treatment is carried out at a temperature which is higher than the deformation temperature of the coating but lower than the deformation temperature of the core thread in order to press the coating positioned under the loops into spaces between the loops.

The invention is based on the idea that the link thread is maintained straight and without any deformations and that the movement of the spirals along the link thread in the axial direction of the thread is prevented by means of impressions formed in the coating of the link thread during the thermal fixation of the wire. During the thermal treatment, some coating material is displaced away from the points of contact between the loops and the link thread into the free spaces between the loops in such a manner that grooves are formed in the coating in which the loops are positioned. The core thread of the link thread, which core thread acts as a main connecting thread, is maintained straight and the cross-section thereof remains unchanged. Because the spirals press grooves for themselves into the coating of the link thread by displacing material, the impressions form sharp edges, on account of which the loops are better maintained in place also at the edges of the wire, thus preventing disadvantageous fraying of the wire. Because the core thread does not undergo any deformations, the resistance to hydrolysis of the link thread will not be reduced when using the method according to the invention.

The invention also concerns a spiral wire manufactured according to the method described above, which is characterized in that each link thread comprises a straight core thread provided with a surface coating, in which grooves are deformed at the points of contact of the loops.

The coating of the link thread can be a plastic essentially softening or reacting at a lower temperature than the core thread. Such thermoplastics are e.g. polyethylene, polypropene, polyvinyl, polyamide and thermoplastic polyester. The coating becomes soft when heated, whereby impressions or grooves are formed in the plastic under the influence of the pressure caused by the loops of the spirals. The impressions or grooves harden and maintain their shape when the plastic is cooled. Among plastics of a thermosetting type, such materials as polyurethane, epoxy plastic and polystyrene may be mentioned. The impressions or grooves are formed in the coating under the pressure caused by the loops of the spirals, when the plastic is still in an inert state. When the plastic is subjected to heating, the plastic reacts and the impressions harden and maintain their shape.

The core thread can be formed of a thermoplastic or a thermosetting plastic, the softening or reaction temperature of which, however, exceeds the corresponding temperature of the coating. The core thread can as well be formed of some other material, such as metal, coal fiber or glass fiber.

It is of advantage that the spirals are provided with a coating similar to that on the link threads, whereby a still stronger anchoring effect is obtained.

The invention will be described more closely in the following with reference to the attached drawings.

DESCRIPTION OF THE PREFERRED EMBODIMENTS

Figure 1:
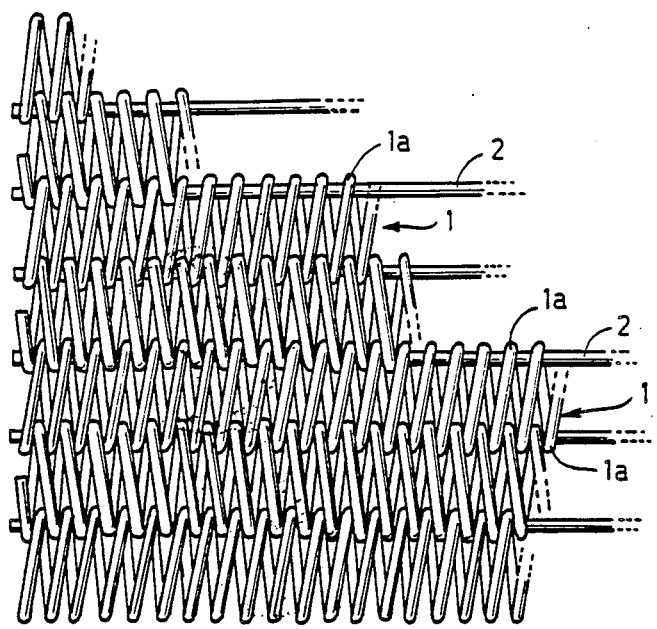
FIG. 1 is a schematical top view of a spiral wire made of spirals before thermal fixation.
Figure 2:
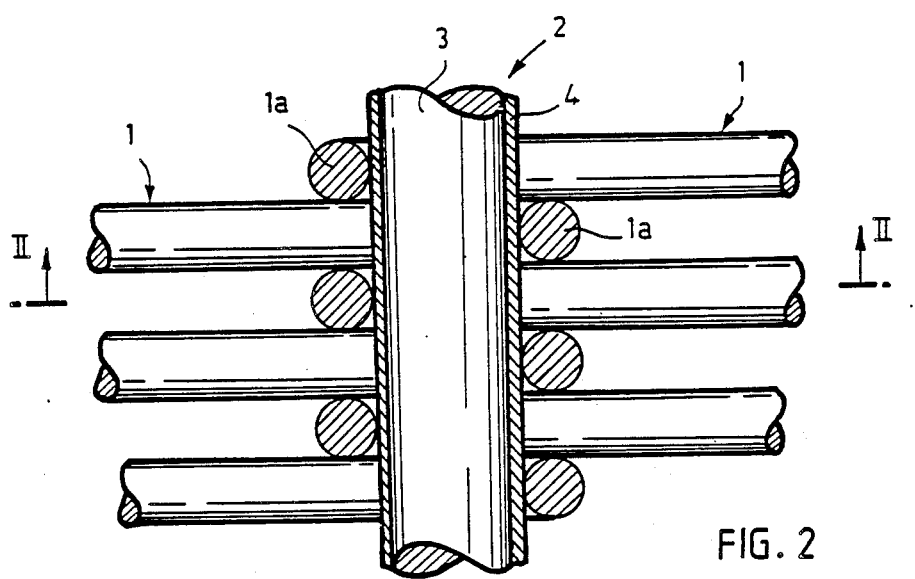
FIGS. 2 and 4 are enlarged views of a seam between two adjacent spirals before and after thermal fixation of the wire respectively
Figure 3:
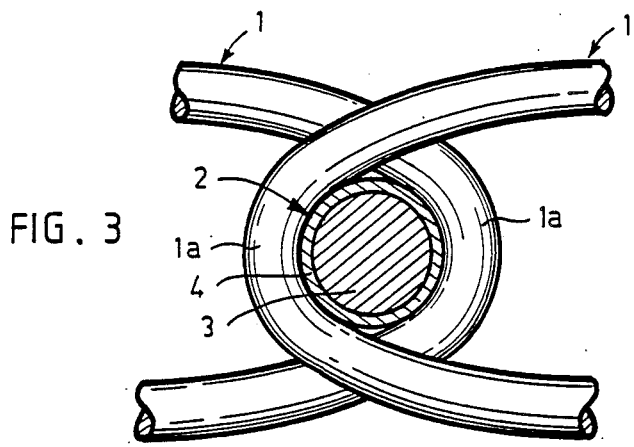
FIGS. 3 and 5 are cross-sections of the corresponding seams before and after thermal fixation.
Figure 4:
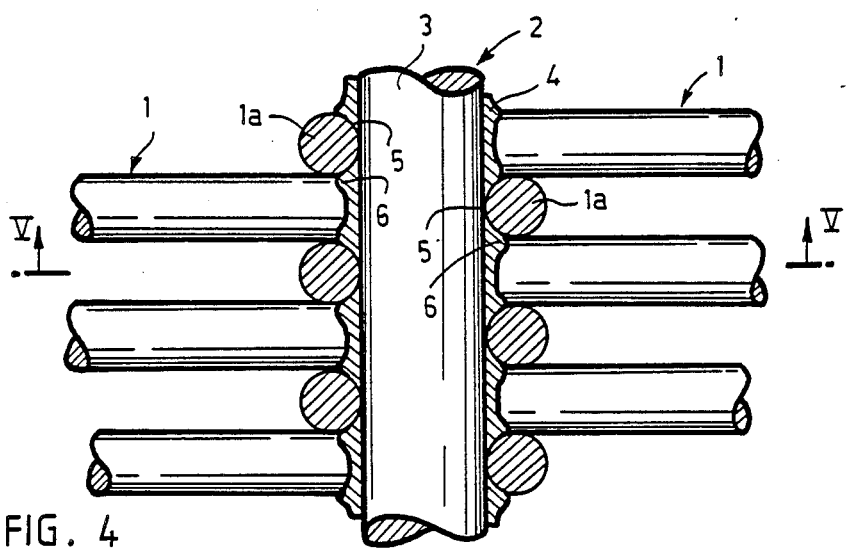
Figure 5:
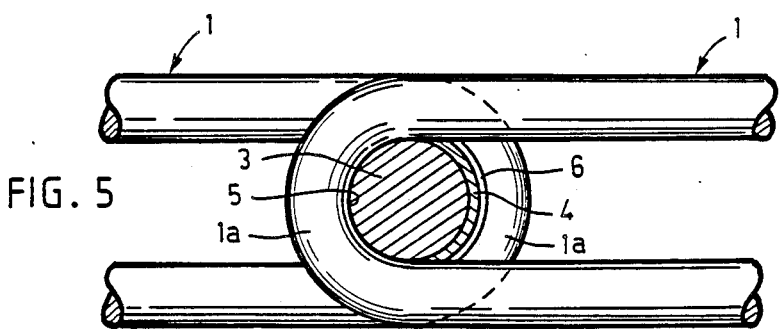

The spiral wire illustrated in FIG. 1 is made of a plurality of spirals 1 which are positioned in parallel with and adjacent each other at the same level. The spirals form loops 1a, by means of which the spirals are interconnected. For this purpose, the spirals are fitted in pairs with the loops intermeshing to form rows of loops in the transverse direction of the wire. A link thread 2 is passed inside each row of loops in such a manner that the loops are pressed against the link thread alternately from opposite sides. A wire thus obtained is subjected to simultaneous stretching and heating for the thermal fixation of the wire, whereby the spirals are flattened and the wire gets its final shape and a stable structure. In the present example, the spirals are made of a polyester monofilament having a thickness of 0.55 mm.

According to the invention, the link thread 2 is formed by a core thread 3 and a surrounding coating 4. The core thread is, in the present example, formed by a polyester monofilament having a thickness of 0.7 mm, whereas the coating is formed by a polyamide layer of a thickness of 0.1 mm, the softening temperature of which is lower than that of the core thread.

The coating of the link thread is in the shape of a cylindrical layer before the thermal treatment of the wire. When the wire is stretched and simultaneously heated to a temperature which is higher than the softening temperature of the coating but lower than the softening temperature of the core thread, the coating gets soft, whereby the loops of the spirals are pressed against the coating and displace some coating material away into the free spaces between the loops. Grooves 5 having round bottoms and ridges 6 lining said grooves are thus formed in the coating at points corresponding to the loops, which grooves and ridges are hardened when the temperature drops, thus preventing an axial movement of the loops along the link thread. The core thread is maintained completely straight.

According to one embodiment, the spirals are provided with a similar coating than the link threads, whereby the anchoring of the loops of the spirals on the link threads is made still more effective.

The drawings and the description related thereto are only intended to illustrate the idea of the invention. In its details, the method and the spiral wire according to the invention may vary within the scope of the claims.

Thus, it is possible to choose the coating material of the link thread so that the softening temperature thereof is within the softening range of the spiral material, whereby, when the wire is subjected to thermal fixation, both the coating of the link thread and the loops of the spirals are deformed simultaneously, so that the grooves of the coating and the loops form a slightly oval cross-section.

We claim:

1. Spiral wire, comprising:
    adjacent spirals positioned in pairs with their loops intermeshing to form transverse rows of loops; and
    initially straight link threads of uniform cross-section passed through the rows of loops, whereby the loops of adjacent spirals are pressed against said link threads alternately from opposite sides, characterized in that in the spiral wire each link thread after said pressing comprises a straight core thread of uniform cross-section provided with a surface coating, in which grooves are formed only in said surface coating at the points of contact of the link threads and the loops.

2. Spiral wire according to claim 1, characterized in that the deformation temperature of the coating of the link thread is lower than that of the core thread.

3. Spiral wire according to claim 2, characterized in that the coating of the link thread is formed of a thermosetting plastic, the reaction temperature of which is lower than the softening temperature of the core thread.

4. Spiral wire according to claim 2, characterized in that the coating of the link thread is formed of a thermoplastic, the softening temperature of which is lower than that of the core thread.

5. Spiral wire according to claim 4, characterized in that the spirals are provided with a coating similar to the coating of the link threads.

6. A method of manufacturing a spiral wire formed by adjacent spirals, comprising the steps of:
    positioning the spirals in pairs with their loops intermeshing to form rows of loops in the transverse direction of the wire;
    passing an initially straight link thread having a uniform cross-section, formed by a straight core thread provided with a coating deformable at a lower temperature than the core thread, through each row of loops;
    subjecting the wire to longitudinal stretching and thermal treatment in order to fix said link threads axially immovably with respect to the loops, characterized in that the thermal treatment is carried out at a temperature which is higher than the deformation temperature of the coating but lower than the deformation temperature of the core thread, in order to press the coating positioned under the loops into spaces between the loops while the core threads remain straight and undeformed throughout said treatment.

* * * * *